W. PASCOE.
INCLOSED TOASTER.
APPLICATION FILED SEPT. 11, 1920.
1,425,685.
Patented Aug. 15, 1922.
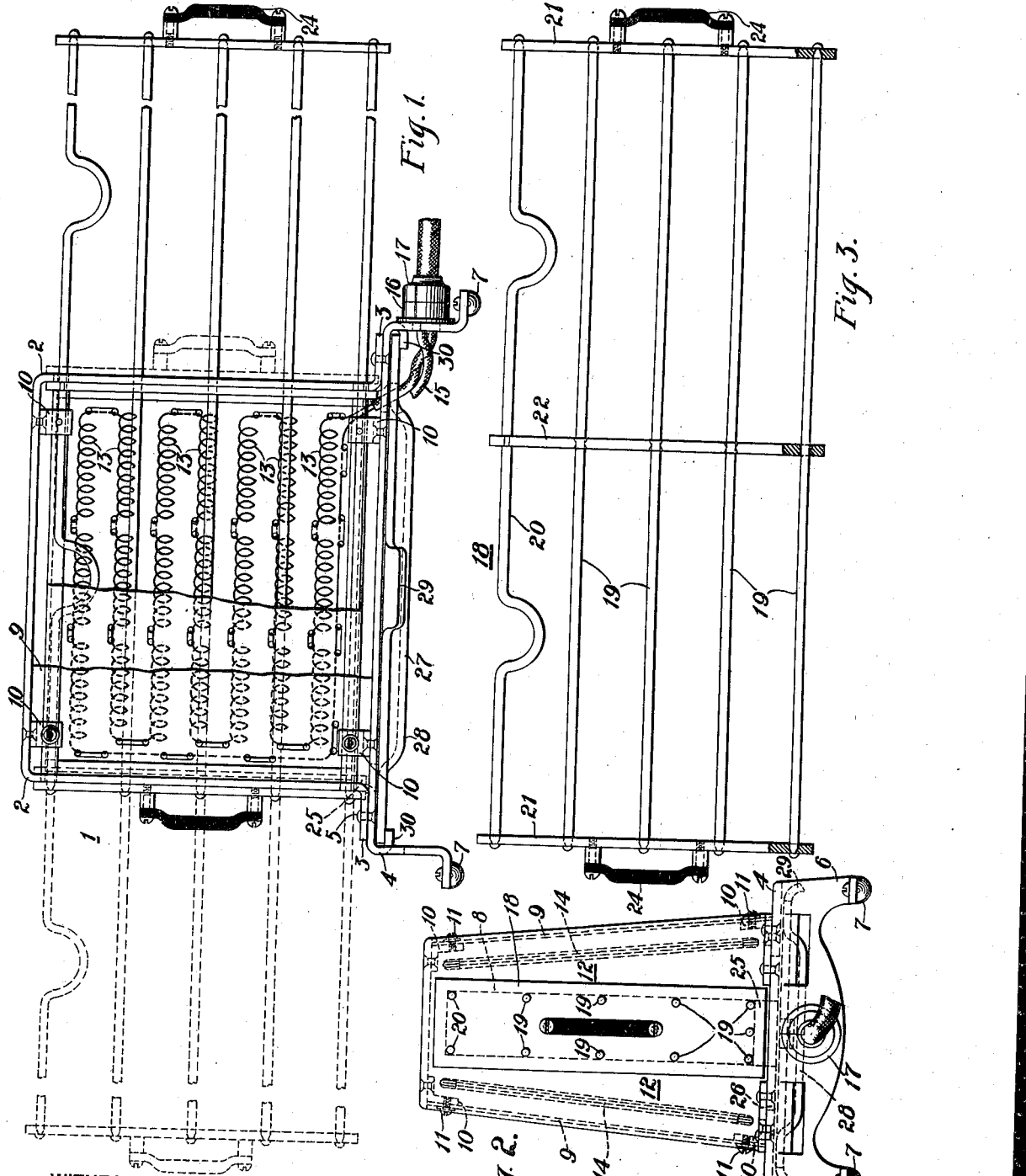
WITNESSES:
H. J. Shelhamer
H. M. Biebel
INVENTOR
Wilbur Pascoe
BY
Wesley G. Carr
ATTORNEY

UNITED STATES PATENT OFFICE.

WILBUR PASCOE, OF DETROIT, MICHIGAN, ASSIGNOR TO WESTINGHOUSE ELECTRIC & MANUFACTURING COMPANY, A CORPORATION OF PENNSYLVANIA.

INCLOSED TOASTER.

1,425,685.  Specification of Letters Patent.  Patented Aug. 15, 1922.

Application filed September 11, 1920. Serial No. 409,558.

*To all whom it may concern:*

Be it known that I, WILBUR PASCOE, a citizen of the United States, and a resident of Detroit, in the county of Wayne and State of Michigan, have invented a new and useful Improvement in Inclosed Toasters, of which the following is a specification.

My invention relates to electrically heated apparatus and particularly to electrically heated toaster stoves.

The object of my invention is to provide a toaster stove of the inclosed type with a new and improved material holder.

In practicing my invention, I provide an enclosing metal casing having windows of mica or other suitable material and suitable extensions at the bottom to serve as supports for such casing. I provide a reciprocally movable two-part material holder comprising a plurality of horizontally disposed metal rods or wires held in spaced relation by means of metal plates, the plates also acting as closing means for the openings in the metal casing in which the material holder moves. I provide also two heating coils mounted on suitable insulating material in substantially vertical and parallel planes in said casing and a two-part removable tray at the bottom of said casing for catching the crumbs.

In the single sheet of the accompanying drawing, Figure 1 is a side elevation of the device embodying my invention, with certain parts cut away; Fig. 2 is an end view of the device embodying my invention, and Fig. 3 is a side elevation of the material holder, with certain parts shown in section.

Referring particularly to Fig. 1, an enclosing casing 1 comprises a piece of sheet metal 2 of substantially U-shape having relatively small longitudinal extensions 3 at each end so that it may be mounted on, and secured to, a supporting member or base 4 also made of sheet metal. The two parts may be fastened together, as by rivets 5. The base 4 is provided with downwardly extending portions 6 at each end adapted to support the complete device 1, each of the several extensions 6 being provided, at the bottom, with semi-spherical members 7 made of heat-insulating material to prevent marring or scratching the surface upon which the device is placed while in use. Each of the vertically extending parts of the sheet metal piece 2 is provided with a rectangular opening 8 for a purpose to be hereinafter described. Mica windows 9 are provided in the sides of the casing 1 in order that the process of toasting may be observed. A plurality of metal pieces 10 of L-shape are riveted to the member 2 and the mica windows 9 are secured to these pieces by means of screws 11.

Two sets of heating elements 12 respectively comprise a plurality of coils 13 suitably mounted on sheets of mica 14 which are in turn, suitably secured to the sheet metal 2 so as to hold the heating elements substantially vertical, the sheets 14 serving also as barriers to govern the convection currents of heated air. Illustration of the coils 13 is omitted from Fig. 2 in order to simplify the drawing but, in actual practice they are located on the inner side of each mica sheet 14 so as to bring the source of heat next to the material being toasted and on each side thereof. The ends of the resistor wires 13 are connected, by means of suitably insulated leads 15, to a terminal socket 16 suitably mounted at one end of the base 4, and a connecting plug 17 may be operatively attached to the terminal socket 16 when it is desired to energize the heating elements 12.

A two-part material holder 18 comprises a plurality of horizontally disposed rods or wires 19 and 20, each of the rods 20 being provided with a depressed portion in each of the two parts of the holder to enable the operator to remove the toasted material, while the wires or rods 19 are substantially straight. The rods 19 and 20 are held in spaced relation by means of two end plates 21 of metal, the ends of the rods being upset against the outer surfaces of the plates. A metal plate 22, similar to the plates 21, is provided intermediate them and may be held in proper location on the rods 19 and 20 by any suitable means. The rods 19 and 20 are so combined with the plates 21 and 22 as to form two receptacles for slices of bread, and the plates 21 and 22 are so mounted as to constitute covers for the respective end openings 8 of the casing 1 when the material holder 18 is in either toasting position. The plate 22 is placed inside the casing and serves to limit the reciprocal longitudinal movement of the material holder 18 in each direction, as indicated in Fig. 1, where the material holder is shown in its two extreme positions, by full and by broken lines, respectively. An insulated handle 24 is provided at each end of the material holder 18 and is suitably secured to the corresponding end plate 21 to enable the operator to move the holder back and forth in the casing. The lowermost rods 19 slide on vertically disposed members or bosses 25 located at the respective ends of the casing and inside the same being punched from the supporting base 4. A two-part crumb tray 27, having a centrally depressed portion 28 is slidably mounted in the base 4 to close the opening 26 and catch the crumbs which may fall from the pieces of bread while being toasted. Each half of the tray 27 is provided with an outwardly extending curved lip 29 to serve as handle. A portion 30 of each of the downwardly-extending base members 6 is punched inwardly to constitute supporting means for the crumb tray 27.

I have thus provided a toaster stove with an enclosing casing having mica windows to permit the process of toasting to be observed and in which the material being toasted is so held in a cage or holder between two heating elements that both sides may be toasted at the same time. By reason of the inclosed construction, a smaller amount of energy will be required to toast a given amount of material in a given time than would be required in an open toaster stove of the usual construction. The structure shown and described permits the removal of a toasted piece of bread and the insertion of a fresh piece while another piece is being toasted, and the plates 21 and 22 cover the openings 8 during the toasting process and only a small amount of heat can escape from the casing while the material holder or rack is being moved back and forth.

While I have shown a specific embodiment of my invention, various modifications may be made therein without departing from the spirit and scope of my invention, and I desire that only such limitations shall be placed thereon as are imposed by the prior art or are specifically set forth in the appended claims.

I claim as my invention:

1. In an electric heater, the combination with an enclosing casing having a plurality of oppositely disposed openings and a plurality of heating coils located in said casing of a two-part material holder reciprocally movable in said openings.

2. In an electric heater, the combination with an enclosing casing having a plurality of oppositely disposed openings, and a plurality of heating elements located in substantially vertical positions in said casing, of a two-part material holder reciprocally movable in said openings and embodying means for closing said casing openings.

3. In an electric heater, the combination with an enclosing casing having a plurality of oppositely disposed openings, and a plurality of heating coils located in said casing, of a two-part material holder reciprocally movable in said openings in said casing and embodying means for limiting said longitudinal movement and for closing said openings.

4. In an electric heater, the combination with an enclosing casing having a plurality of oppositely disposed openings, and a plurality of heating coils located in said casing, of means in said casing for holding material to be heated and further means joined longitudinally to said first means for holding material to be heated, both said means being reciprocally movable in said casing openings.

5. In an electric heater, the combination with an enclosing casing having a plurality of oppositely disposed openings and a plurality of heating coils, of a two-part material holder longitudinally and reciprocally movable in said openings.

6. In an electric heater, the combination with an enclosing casing having a plurality of oppositely disposed rectangular openings, and a plurality of heating coils disposed in said casing, of a two-part material holder reciprocally movable in said casing openings, said holder comprising a plurality of horizontally disposed parallel rods, two vertically disposed end plates and another plate intermediate said end plates, all of said plates being secured to said rods.

7. In an electric heater, the combination with an enclosing casing having a plurality of oppositely disposed rectangular openings and a plurality of heating coils disposed longitudinally and substantially vertically in said casing, of a two-part material holder longitudinally and reciprocally movable in said casing openings, said holder having means for limiting said reciprocal longitudinal movement and for closing said rectangular openings at each end of its reciprocal movement, and a two-part tray slidably secured to the bottom of said casing, the parts being movable laterally and in opposite directions.

8. In a toaster stove, the combination with an enclosing casing having a plurality of oppositely disposed openings, and a plurality of substantially vertically disposed heating coils located in said casing, of means for holding the material being toasted inside of said casing, and additional means joined longitudinally to said first holding means to permit removal of toasted material and the insertion of fresh material to be toasted, outside of said casing.

In testimony whereof, I have hereunto subscribed my name this 28th day of Aug. 1920.

WILBUR PASCOE.